US011861246B2

(12) United States Patent
Ishida

(10) Patent No.: US 11,861,246 B2
(45) Date of Patent: Jan. 2, 2024

(54) SYSTEM AND METHODS FOR DETERMINING WHETHER AN EXECUTION INSTRUCTION IS ASSOCIATED WITH A TARGET USER

(71) Applicant: Toshiba Tec Kabushiki Kaisha, Tokyo (JP)

(72) Inventor: Takehisa Ishida, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/484,741

(22) Filed: Sep. 24, 2021

(65) Prior Publication Data
US 2023/0094181 A1 Mar. 30, 2023

(51) Int. Cl.
G06F 3/12 (2006.01)
H04N 1/00 (2006.01)

(52) U.S. Cl.
CPC .......... *G06F 3/1224* (2013.01); *G06F 3/1238* (2013.01); *G06F 3/1288* (2013.01); *H04N 1/00973* (2013.01)

(58) Field of Classification Search
None
See application file for complete search history.

(56) References Cited

U.S. PATENT DOCUMENTS

| 9,282,214 | B2* | 3/2016 | Sato | H04N 1/32026 |
| 10,761,793 | B2 | 9/2020 | Nishikawa | |
| 2015/0339561 | A1* | 11/2015 | Takenaka | G06F 3/1222 358/1.14 |
| 2020/0104085 | A1 | 4/2020 | Sako | |
| 2020/0319832 | A1* | 10/2020 | Zhao | G06F 3/1267 |
| 2021/0385356 | A1* | 12/2021 | Okabe | H04N 1/4433 |
| 2022/0269454 | A1* | 8/2022 | Nakajima | G06F 3/1238 |

* cited by examiner

*Primary Examiner* — Miya J Cato
(74) *Attorney, Agent, or Firm* — FOLEY & LARDNER LLP

(57) ABSTRACT

An image forming device includes a storage unit and a control unit. The storage unit stores user information according to a specific device connected to an external network in advance. The control unit receives an execution instruction as an execution instruction of a job by a user indicated by the user information according to the specific device, if the execution instruction of the job is received from the specific device via the external network, and executes the job according to the execution instruction.

10 Claims, 3 Drawing Sheets

SYSTEM AND METHODS FOR DETERMINING WHETHER AN EXECUTION INSTRUCTION IS ASSOCIATED WITH A TARGET USER

FIELD

Embodiments described herein relate generally to an image forming device and an image forming method.

BACKGROUND

In recent years, a user has been able to use a service by executing an application on a device on a network, such as a cloud (hereinafter referred to as a "server device"). For example, an image forming device and a server device are connected to each other via a network to perform a new service using the image forming device. For example, document data obtained by scanning with an image forming device can be uploaded to a server device and stored. The document data stored in the server device can be downloaded to the image forming device and printed. However, if user authentication is introduced to improve the security of the image forming device, the above service may not be performed. In this case, the introduction of user authentication may reduce convenience of the service and may result in the service not being performed.

DETAILED DESCRIPTION

Figure 1:
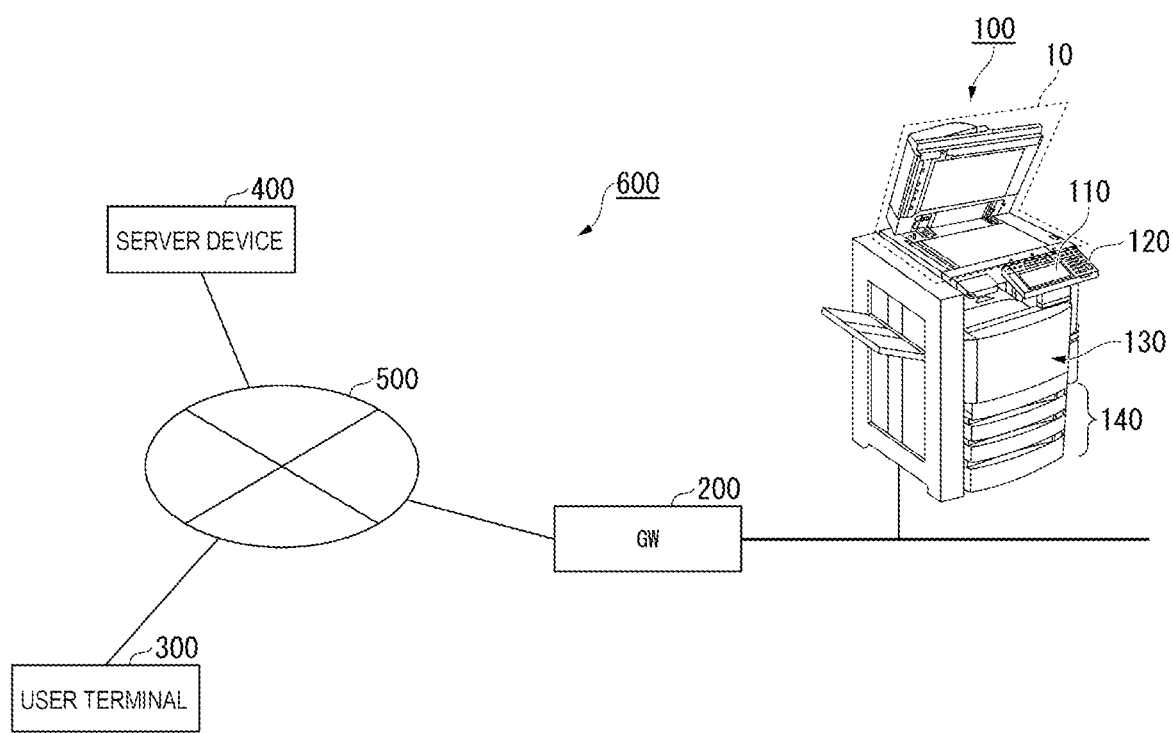
FIG. 1 is a diagram illustrating a configuration example of an image forming system of an embodiment.

In general, according to one embodiment, an image forming device includes a storage unit (memory) and a control unit (controller). The storage unit stores user information according to a specific device connected to an external network in advance. The control unit receives an execution instruction as an execution instruction of a job by a user indicated by the user information according to the specific device, if the execution instruction of the job is received from the specific device via the external network, and executes the job according to the execution instruction. Hereinafter, an image forming device and an image forming method according to the embodiment will be described with reference to the drawings. FIG. 1 is a diagram illustrating a configuration example of an image forming system 600 of the embodiment. The image forming system 600 includes one or a plurality of image forming devices 100, a user terminal 300, and a server device 400. The image forming device 100 is a device that forms an image on a sheet. The image forming device 100 is, for example, a multifunction device. The image forming device 100 is communicably connected to a network 500, for example, via a network such as Local Area Network (LAN) and a GateWay (GW) 200. For example, the network 500 may be configured by using the Internet or a mobile communication network. The user terminal 300 is used if instructing the server device 400 to transmit a remote job to be executed by the image forming device 100. The server device 400 instructs the image forming device 100 to execute a remote job based on the instruction received from the device, such as the user terminal 300. The image forming device 100 and the server device 400 are communicably connected to each other via the network 500. The user terminal 300 and the server device 400 are communicably connected to each other via the network 500. Hereinafter, the devices will be described in detail.

Figure 2:
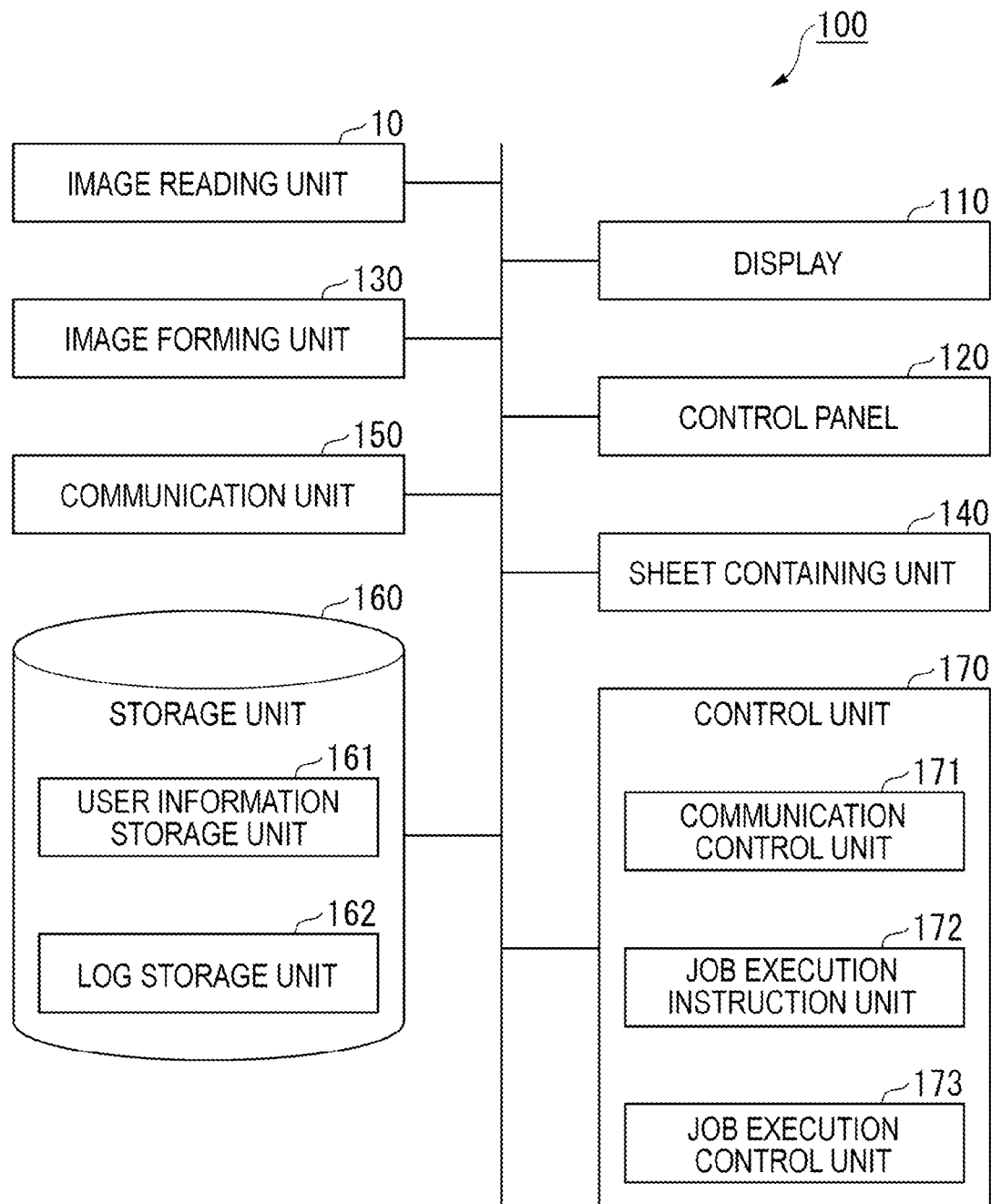
FIG. 2 is a hardware block diagram of an image forming device.

FIG. 2 is a hardware block diagram of the image forming device 100 according to the embodiment. First, the image forming device 100 will be described in detail with reference to FIGS. 1 and 2. The image forming device 100 includes an image reading unit 10, a display 110, a control panel 120, an image forming unit 130, a sheet containing unit 140, a communication unit 150, a storage unit 160, and a control unit 170.

The image forming device 100 forms an image on a sheet by using a developer, such as a toner or ink. If the developer is a toner, the developer is heated and fixed to the sheet. If the developer is ink, the developer is dropped to a sheet to form an image on the sheet. The sheet is, for example, a paper or a label paper. The sheet may be any material so long as the image forming device 100 can form an image on the surface thereof. The image reading unit 10 reads image information to be read based on brightness and darkness of light. The image reading unit 10 records the read image information. The recorded image information may be transmitted to another information processing device (for example, the server device 400) via the network 500. The recorded image information may be formed as an image on the sheet by the image forming unit 130.

The display 110 is an image display device, such as a liquid crystal display or an organic Electro Luminescence (EL) display. The display 110 displays various kinds of information relating to the image forming device 100. The control panel 120 includes an operation device, such as a plurality of buttons. The control panel 120 receives an operation of the user. For example, the control panel 120 may receive an input of a number or a character. For example, the control panel 120 may receive an operation of selecting one or a plurality of jobs from candidates displayed on the display 110. The control panel 120 outputs a signal according to the operation performed by the user to the control unit 170. The display 110 and the control panel 120 may be configured as an integrated touch panel.

The image forming unit 130 forms an image on the sheet based on the image information generated by the image reading unit 10 or the image information received via the network 500. The image forming unit 130 includes, for example, a photoconductor drum, an exposure device, a developing device, a transfer device, and a fixing device. A conveyance path of a sheet is formed in the image forming unit 130. The sheet to be processed is conveyed by a roller provided in the conveyance path. An image is formed on a sheet in the course of the conveyance. The image forming unit 130, for example, forms an image by processes, as described below. The exposure device of the image forming unit 130 forms an electrostatic latent image on the photoconductor drum based on the image information. The developing device of the image forming unit 130 forms a visible image by attaching the developer on the electrostatic latent image.

The transfer device of the image forming unit 130 transfers the visible image to the sheet. The fixing device of the image forming unit 130 fixes the visible image on the sheet by heating and pressurizing the sheet. In addition, the sheet on which the image is formed may be a sheet contained in the sheet containing unit 140 and conveyed and may be a sheet that is manually fed. The sheet containing unit 140 contains a sheet used for forming an image by the image forming unit 130 and conveys the sheet to the image forming unit 130 by a conveyance roller.

The communication unit 150 is configured by using a communication interface. The communication unit 150 communicates with the other devices (for example, the server device 400) via the network 500.

The storage unit 160 is configured by using a storage device, such as a magnetic hard disk device or a semiconductor storage device. The storage unit 160 stores data required when the image forming device 100 operates. The storage unit 160 functions, for example, as a user information storage unit 161 and a log storage unit 162.

The user information storage unit 161 stores information relating to a valid user of the image forming device 100. The valid user of the image forming device 100 refers to a user who is authorized to instruct the image forming device 100 to execute a job. The user information storage unit 161 may store identification (ID) information of each valid user (hereinafter, referred to as "user ID") as the user information. The user information storage unit 161 may store a user ID and authentication information (for example, a password) in association with each other. The user information storage unit 161 stores user information (hereinafter, referred to as "remote user information") according to remote job information described below. The user information includes at least a user ID. As described above, the user information may further include the authentication information in addition to the user ID.

The user information storage unit 161 may further store information indicating the content of the authority in association with the user ID of the valid user. The information indicating the content of the authority refers to, for example, the type of a job that the user can instruct, the content of the job, or the content of an option.

The log storage unit 162 stores information indicating the history of the job executed by the image forming device 100. For example, the log storage unit 162 may store the content of the executed job, the date and time of the execution, and the user ID of the user who instructs the execution, in association with each other. The control unit 170 is configured by using a processor such as a Central Processing Unit (CPU) and a memory. The control unit 170 reads and executes a program stored in the storage unit 160 in advance. The control unit 170 controls an operation of each device included in the image forming device 100. The control unit 170 functions, for example, as a communication control unit 171, a job execution instruction unit 172, and a job execution control unit 173.

The communication control unit 171 communicates with the server device 400. According to the present embodiment, the server device 400 illustrated in FIG. 1 is registered in advance in the image forming device 100 as a valid device. For example, the identification information indicating the valid server device 400 may be registered in the storage unit 160 in advance. If data is received from the valid server device 400, the communication control unit 171 transmits the received data to the job execution instruction unit 172. Meanwhile, if data is received from a server device other than the valid server device 400, the communication control unit 171 executes an error process. For example, the communication control unit 171 may discard data without transmitting the received data to the job execution instruction unit 172. Examples of the data received by the communication control unit 171 from the valid server device 400 include remote job information. The remote job information is information for the server device 400 to instruct the image forming device 100 to execute the job. The remote job information is job information that reaches the image forming device 100 via an external network (for example, the network 500) different from a local network (internal network). The job information is information for instructing the image forming device 100 to execute the job.

In the example of FIG. 1, in the image forming device 100, the network inside the GW 200 corresponds to the internal network, and the network outside the GW 200 corresponds to the external network. In other words, the network of the area of which the security is controlled by an administrator in the network to which the image forming device 100 is connected is the internal network. Meanwhile, the network of which the security is not controlled by the administrator is the external network. In the remote job information, information indicating the job instructed by the user terminal 300 (hereinafter, referred to as a "remote job") and information indicating the own device (the server device 400) may be included. As the information indicating the own device, information relating to hardware of the server device 400 may be used, and information indicating an application that operates on the server device 400 may be used. Specific examples of such an application include a cloud application. In this case, for example, the user terminal 300 may access a cloud application, and the cloud application may transmit the remote job information to the image forming device 100 in response to the operation of the user. If the job information is received, the job execution instruction unit 172 instructs the job execution control unit 173 to execute the job based on the received job information. If the received job information is remote job information, the job execution instruction unit 172 reads the user information (remote user information) according to the remote job information from the user information storage unit 161. The job execution instruction unit 172 instructs the job execution control unit 173 to execute the job according to the remote job information as the instruction of the user indicated by the remote user information (hereinafter, referred to as a "remote user").

The job execution control unit 173 executes the job in response to the instruction received from the job execution instruction unit 172. If the instruction of the execution of the remote job is received as the instruction of the remote user, the job execution control unit 173 inquires the user information storage unit 161 as to whether the remote user is a valid user and what authority the remote user has. According to the present embodiment, the information of the remote user is registered in the user information storage unit 161 as the information of the valid user. Therefore, the job execution control unit 173 determines the remote job as an instruction from the valid user and executes the remote job.

If the execution of the job is completed, the job execution control unit 173 transmits information indicating the completion (hereinafter, referred to as "execution information") to the communication control unit 171 via the job execution instruction unit 172. If the execution of the job is completed, the job execution control unit 173 records the log information indicating the history of the execution of the job in the log storage unit 162.

The user terminal 300 is information device that is operated by the user. The user terminal 300 is configured, for example, by using a device such as a smartphone, a mobile phone, a wearable device, a portable game machine, a stationary game machine, a television receiver, a smart speaker, a home appliance, or a robot. The user terminal 300 accesses the server device 400 via the network 500. The user terminal 300 includes a user interface. The user terminal 300 generates the information of the instruction indicating the execution of the job (hereinafter, referred to as "instruction information") in the image forming device 100 in response to the operation of the user with respect to the user interface. The user terminal 300 transmits the instruction information to the server device 400. The user terminal 300 may be configured so that the information indicating the operation of the user (including the information of the voice of the user and utterance (speech) content) is simply transmitted to the server device 400. In this case, the server device 400 may generate the instruction information based on the information indicating the operation of the user.

The server device 400 is configured by using one or a plurality of information processing devices. The server device 400 generates the remote job information based on the information of the operation received from the user terminal 300. The server device 400 transmits the remote job information to the image forming device 100 via the network 500.

Figure 3:
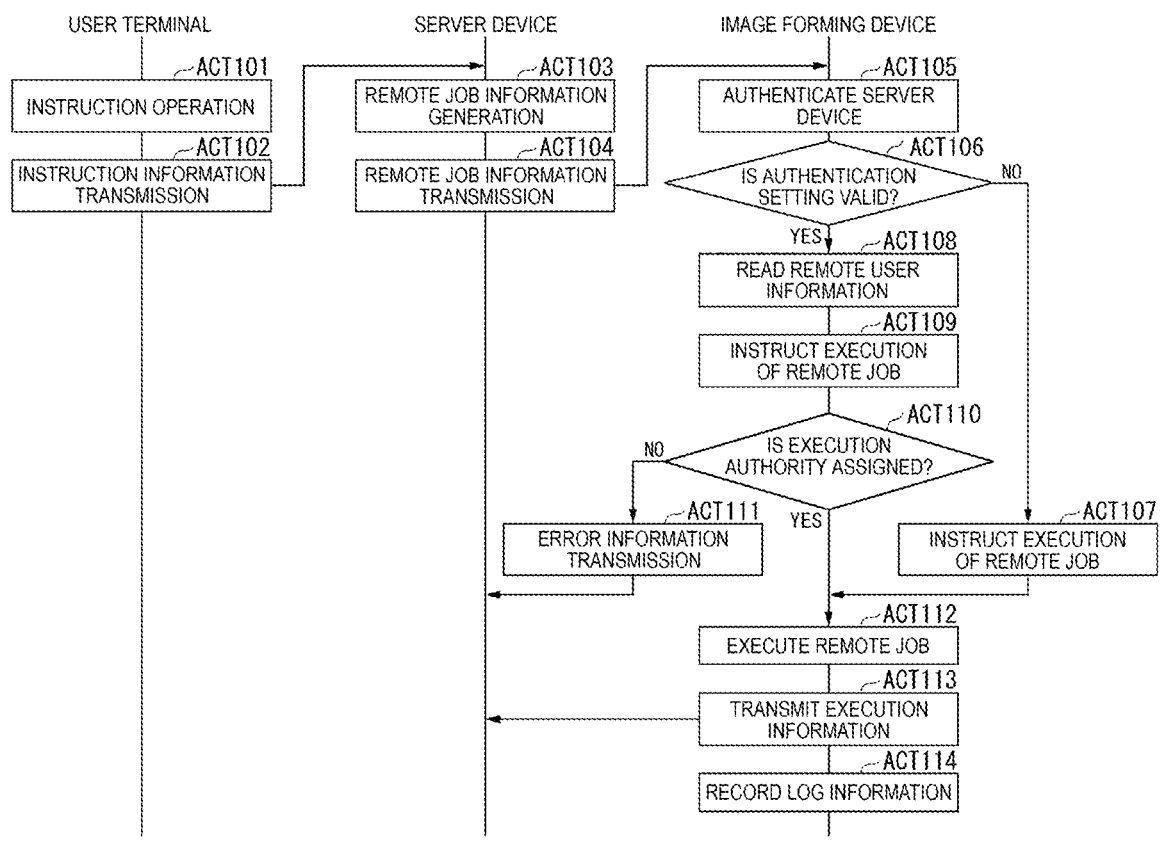
FIG. 3 is a sequence chart illustrating a specific example of an operation of the image forming system.

FIG. 3 is a sequence chart illustrating a specific example of an operation of the image forming system 600. First, the user operates the user terminal 300 and accesses the application that operates on the server device 400. The user terminal 300 receives the operation of the user on the user interface (ACT 101). The user terminal 300 generates the instruction information in response to the operation of the user. The user terminal 300 transmits the instruction information to the server device 400 (ACT 102).

The server device 400 generates the remote job information based on the information of the operation received from the user terminal 300 (ACT 103). The server device 400 transmits the remote job information to the image forming device 100 via the network 500 (ACT 104). The communication control unit 171 of the image forming device 100 receives the remote job information. The communication control unit 171 authenticates the server device 400 that is the transmission source of the remote job information based on the information included in the remote job information (ACT 105). If the server device 400 is authenticated, the communication control unit 171 transmits the received remote job information to the job execution instruction unit 172. If the server device 400 is not authenticated, the communication control unit 171 discards the received remote job information without transmitting the received remote job information to the job execution instruction unit 172.

The job execution instruction unit 172 determines whether the authentication setting is valid (ACT 106). If the authentication setting is not valid (ACT 106-NO), the job execution instruction unit 172 instructs the job execution control unit 173 to execute the remote job (ACT 107). In this case, the job execution control unit 173 executes the instructed remote job (ACT 112).

Meanwhile, if the authentication setting is valid (ACT 106-YES), the job execution instruction unit 172 reads the remote user information from the user information storage unit 161 (ACT 108). The job execution instruction unit 172 instructs the execution of the remote job to the job execution control unit 173 as the instruction of the job execution by the read remote user information (ACT 109).

The job execution control unit 173 determines whether the authority of the execution of the instructed remote job is assigned to the remote user (ACT 110). If the authority of the execution is not assigned (ACT 110-NO), the job execution control unit 173 transmits error information to the server device 400 (ACT 111). Meanwhile, if the authority of the execution is assigned (ACT 110-YES), the job execution control unit 173 executes the remote job (ACT 112).

If the execution of the remote job is completed, the job execution control unit 173 transmits the execution information to the server device 400 (ACT 113). Also, the job execution control unit 173 records the log information relating to the executed remote job in the log storage unit 162 (ACT 114).

The image forming system 600 configured in this manner can improve the convenience while maintaining the security of the image forming device 100 by the introduction of the user authentication. Details thereof are as follows. In the image forming system 600, if the image forming device 100 receives an instruction to execute the remote job from the server device 400 via the external network (the network 500), the execution of the job is instructed as being instructed by the user of the remote user information. The user of the remote user information is registered in the user information storage unit 161 as the valid user in advance. Therefore, in the image forming device 100, the remote job is executed as the instruction by the valid user.

While certain embodiments have been described these embodiments have been presented by way of example only, and are not intended to limit the scope of the present disclosure. Indeed, the embodiments described herein may be embodied in a variety of other forms. Furthermore, various omissions, substitutions, and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. An image forming device comprising:
a memory configured to store:
a target user information of a target user associated with a target device connected to the image forming device via an external network, the target user information including a target authority of the target user, and
a second user information of a second user associated with a second device connected to the image forming device via the external network, the second user information including a second authority of the second user, the second authority different from the target authority; and
a controller configured to:
receive an execution instruction of a job, the controller configured to cooperate with the memory to determine whether the execution instruction is associated with the target user based on the target device, and execute the job according to the execution instruction after determining that the execution instruction is associated with the target user,
cooperate with the memory to determine whether the execution instruction is associated with the second user based on the second device and not execute the job after determining that the execution instruction is associated with the second user,
determine whether the job is within the second authority,
determine whether the job is within the target authority after determining that the job is not within the second authority, and
execute the job only after determining that the job is within the target authority.

2. The image forming device of claim 1, wherein:
the target user information indicates that the target user is a valid user; and
the controller is further configured to authenticate the target user using the target user information.

3. The image forming device of claim 2, wherein the controller is further configured to:
determine, through the authenticating of the target user, that the target user is the valid user, according to the execution instruction; and
execute the job only after determining that the target user is the valid user.

4. The image forming device of claim 2, wherein the controller is further configured to:
determine whether the job is within the target authority, and
execute the job only after determining that the job is within the target authority.

5. The image forming device of claim 1, wherein the target device transmits the execution instruction to the image forming device in response to the execution instruction received from a user terminal operated by the target user.

6. An image forming method performed by an image forming device including a memory that stores target user information of a target user associated with a target device connected to the image forming device via an external network, the target user information including a target authority of the target user, a controller, and a communication unit in communication with the external network, the image forming method comprising:
receiving, by the communication unit, an execution instruction of a job from the target device via the external network;
determining, by the controller, whether the execution instruction is associated with the target user based on the target device;
executing, by the controller, the job according to the execution instructions;
storing, by the memory, a second user information of a second user associated with a second device connected to the image forming device via the external network, the second user information including a second authority of the second user, the second authority different from the target authority;
determining, by the controller, whether the execution instruction is associated with the second user based on the second device;
not execute, by the controller, the job after determining that the execution instruction is associated with the second user;
determining, by the controller, whether the job is within the second authority; and
determining, by the controller, whether the job is within the target authority after determining that the job is not within the second authority;
wherein the controller only executes the after determining that the job is within the target authority.

7. The image forming method of claim 6, further comprising:
storing, by the memory, the target user information of the target user, the target user information indicating that the target user is a valid user; and
authenticate, by the controller, the target user using the target user information.

8. The image forming method of claim 7, further comprising determining, by the controller, through the authenticating of the target user, that the target user is the valid user, according to the execution instruction; wherein the controller only executes the job after determining that the target user is the valid user.

9. The image forming method of claim 7, further comprising;
storing, by the memory, the target authority for the target user; and
determining whether the job is within the target authority; wherein the controller only executes the job after determining that the job is within the target authority.

10. The image forming method of claim 6, further comprising transmitting, by the target device, the execution instruction to the image forming device in response to the execution instruction received from a user terminal operated by the target user.

* * * * *